United States Patent [19]

Sari

[11] 4,394,768
[45] Jul. 19, 1983

[54] ADAPTIVE SYSTEM IN A DIGITAL DATA RECEIVER PROVIDING COMPENSATION FOR AMPLITUDE AND PHASE DISTORTIONS INTRODUCED BY A DATA TRANSMISSION CHANNEL

[75] Inventor: Hikmet Sari, Alfortville, France

[73] Assignee: U.S. Philips Corporation, New York, N.Y.

[21] Appl. No.: 263,453

[22] Filed: May 14, 1981

[30] Foreign Application Priority Data

May 14, 1980 [FR] France ............... 80 10863

[51] Int. Cl.³ .......................................... H04L 25/03
[52] U.S. Cl. ........................................ 375/14; 333/18; 364/724
[58] Field of Search .................. 375/11, 12, 13, 14, 375/51, 57, 58, 99, 101; 333/18, 28 R, 70 T; 364/724, 825, 514

[56] References Cited

U.S. PATENT DOCUMENTS

4,035,735  7/1977  Akashi et al. ................ 375/12

OTHER PUBLICATIONS

H. Nussbaumer "Reducing the Acquistion Time in Automatic Equalizer" Oct. 1975 by IBM *Technical Disclosure Bulletin*, pp. 1465-1479.

Mese & Givili "On the Use of Smoothing Techniques for Digital Channel Equalization" Jun. 4-7, 1978 by *International Conference on Communication*, pp. 25.21-2.4.

*Primary Examiner*—Benedict V. Safourek
*Assistant Examiner*—Stephen Chin
*Attorney, Agent, or Firm*—James J. Cannon, Jr.

[57] ABSTRACT

An adaptive system in a digital data receiver providing compensation for amplitude and phase distortions introduced by the data transmission channel having, at the output of the transmission channel which supplies a signal vector $X_k$, a transversal filter having N weighting coefficients, followed by a decision circuit and further a summing circuit and a multiplying circuit. To determine the N coefficients iteratively the system comprises a circuit for determining an estimated matrix $A_k$ of the autocorrelation matrix A of the signal vectors $X_k$, a circuit for approximating $A_k$ by a circulant matrix $R_k$, a circuit for calculating the diagonal matrix $G_k$ whose diagonal elements are the eigenvalues of $R_k$, a number of calculating circuits and a circuit for up-dating the vector $C_k$ which represents the N weighting coefficients of the filter at the instant $t_o+kT$.

2 Claims, 10 Drawing Figures

$$A = \begin{bmatrix} a_0 & a_1 & a_2 & \cdots & & \cdots & a_{N-2} & a_{N-1} \\ a_1 & a_0 & a_1 & & & & & a_{N-2} \\ a_2 & a_1 & a_0 & & & & & \vdots \\ \vdots & & & & & & & \\ & & & & & & & \vdots \\ & & & & & & & a_2 \\ a_{N-2} & & & & & & & a_1 \\ a_{N-1} & a_{N-2} & \cdots & & & \cdots & a_2 & a_1 & a_0 \end{bmatrix}$$

FIG.2b

$$A = \begin{bmatrix} a_0 & a_1 & a_2 & \cdots & a_{l-2} & a_{l-1} & 0 & \cdots & & 0 \\ a_1 & a_0 & a_1 & & & a_{l-2} & a_{l-1} & & & \vdots \\ a_2 & a_1 & a_0 & & & & & & & 0 \\ \vdots & & & & & & & & & a_{l-1} \\ & & & & & & & & & a_{l-2} \\ a_{l-2} & & & & & & & & & \\ a_{l-1} & & & & & & & & & \\ 0 & & & & & & & & & a_1 \\ \vdots & & & & & & & & & a_1 & a_0 \\ 0 & & & & & & & & & \end{bmatrix}$$

FIG.2c

$$R = \begin{bmatrix} a_0 & a_1 & a_2 & \cdots & a_{s-1} & a_s & a_s & a_{s-1} & \cdots & a_2 & a_1 \\ a_1 & a_0 & a_1 & \cdots & & & & & & & a_2 \\ a_2 & a_1 & a_0 & \cdots & & & & & & & \vdots \\ \vdots & & & & & & & & & & a_{s-1} \\ a_{s-1} & & & & & & & & & & a_s \\ a_s & & & & & & & & & & a_s \\ a_s & & & & & & & & & & a_{s-1} \\ a_{s-1} & & & & & & & & & & \vdots \\ \vdots & & & & & & & & & & \\ a_2 & & & & & & & & & & a_1 \\ a_1 & a_2 & \cdots & a_{s-1} & a_s & a_s & a_{s-1} & \cdots & a_1 & a_0 \end{bmatrix}$$

FIG.3a

$$R = \begin{bmatrix} a_0 & a_1 & a_2 & \cdots & a_{l-1} & 0 & \cdots & 0 & a_{l-1} & \cdots & a_2 & a_1 \\ a_1 & a_0 & & & & & & & & & & a_2 \\ a_2 & & & & & & & & & & & \vdots \\ \vdots & & & & & & & & & & & a_{l-1} \\ a_{l-1} & & & & & & & & & & & 0 \\ 0 & & & & & & & & & & & 0 \\ 0 & & & & & & & & & & & a_{l-1} \\ a_{l-1} & & & & & & & & & & & \vdots \\ \vdots & & & & & & & & & & & \\ a_2 & & & & & & & & & & & a_1 \\ a_1 & a_2 & \cdots & a_{l-1} & 0 & \cdots & 0 & a_{l-1} & \cdots & a_1 & a_0 \end{bmatrix}$$

FIG.3b

$$R^{-1}A = \begin{bmatrix} & & 0 & & \\ \hline & & I & & \\ \hline & & 0 & & \end{bmatrix} \begin{matrix} \updownarrow l-1 \\ \\ \updownarrow l-1 \end{matrix}$$

$\underset{l-1}{\leftrightarrow} \quad \underset{l-1}{\leftrightarrow}$

FIG.4

ADAPTIVE SYSTEM IN A DIGITAL DATA RECEIVER PROVIDING COMPENSATION FOR AMPLITUDE AND PHASE DISTORTIONS INTRODUCED BY A DATA TRANSMISSION CHANNEL

BACKGROUND OF THE INVENTION

1. Field of the Invention

The present invention relates to an adaptive system in a digital data receiver providing compensation for amplitude and phase distortions introduced by a data transmission channel.

2. Description of the Prior Art

It is a known fact that at high transmission rates a correct restitution, at the output of the data transmission channel, of the signals applied to its input is no longer possible without the provision of a compensation circuit, designated equalizer, which is often constituted by a non-recursive transversal filter, that is to say a circuit capable of correcting the response of a transmission channel on the basis of a finite and weighted sum of partial responses available on the consecutive taps of an impedance network based on delay lines. An equalizer of a conventional type, having N weighting coefficients is shown in FIG. 1 (a description of such an equalizer having seven coefficients is given in the publication IEEE Transactions on Information Theory, Vol. IT-15, No. 4, July 1969, pages 484 to 497). Since the impulse response of the channel is not known and furthermore tends to evolve in time, the equalizer must be adaptive, that is to say it must be capable of adjusting its weighting coefficients to their optimum values at the beginning of the transmission (during the acquisition or training phase of the equalizer) and of following thereafter any variations of the channel during the actual transmission phase. This adaptivity finds expression in that the equalizer generates an error signal which is a function of the difference between the exact form of the transmitted digital data and the form they have to the output of the equalizer, and is arranged so as to reduce this error to a minimum.

In order to provide an efficient use of the receiving system, the training phase must be as short as possible, which means that the method of determining the optimum coefficients of the adaptive equalizer must converge as rapidly as possible. Because of their aptitude in following the temporal variations of the data transmission channel, iterative determination methods are frequently employed, such as the stochastic method. But the convergence speed of this method decreases according as the eigenvalues of the signal autocorrelation matrix A of the output signal of the transmission channel are more dispersed, that is to say according as the amplitude distortion introduced by the channel is more important. If the channel were perfect and its spectrum perfectly flat, the distortion would be zero and all the eigenvalues of A would be equal to 1. In reality, as soon as the channel introduces a significant amplitude distortion (or as soon as intersymbol interference is deliberately created for spectrum shaping purposes), the use of the stochastic gradient method becomes ineffectual.

A satisfactory convergence rate may be obtained by using an iterative equalization method of the self-orthogonalizing type as described in the article by R. D. Gitlin and F. R. Magee "Self-Orthogonalizing Adaptive Equalization Algorithms", published in IEEE Transactions on Communications, Vol. COM-25, No. 7, July 1977, pages 666 to 672, the Kalman filter (applied to the field of equalization by D. Godard, see in this respect reference [16] on page 672 of said article) constituting a special case of this method. However, compared to the stochastic gradient method this novel method is characterized by the fact that the circuits required for its implementation are much more complicated and by the fact that the number of operations to be performed in the course of each iteration is increased considerably.

SUMMARY OF THE INVENTION

The invention has for its object to provide an adaptive system in a digital data receiver, in which system the determination of the values of the coefficients of the equalizer by consecutive iterations is realized at a convergence speed which is almost as high as in the last-mentioned article, but whose circuits are however much simpler.

In accordance with the present invention, there is provided, in a digital data receiver, an adaptive system providing compensation for amplitude and phase distortions introduced by a data transmission channel and comprising an adaptive equalizing circuit receiving a signal vector $X_k$ from the data transmission channel output and producing an output signal $y_k$, a decision circuit receiving this output signal $y_k$ and producing an estimation $\hat{s}_{k-d}$ of each one of the digital data $s_{k-d}$ applied to the data transmission channel input, a summing circuit receiving said output signal $y_k$ and said estimation $\hat{s}_{k-d}$ for producing a difference signal $e_k = y_k - \hat{s}_{k-d}$, and a multiplying circuit for multiplying said difference signal $e_k$ by an iteration step $\alpha_k$, characterized in that the adaptive equalizing circuit is a non-recursive transversal filter having N adjustable weighting coefficients and the adaptive systems comprises for the determination of these coefficients by consecutive iterations:

a first circuit for determining, in a matrix $A_k$ which is an estimation of the square signal autocorrelation matrix $A = E(X_k \cdot X_k^{TR})$ at an instant $t_o + kT$, where E is the expectation operator, $X_k^{TR}$ is the transpose of $X_k$, $t_o$ is a constant, k is an integer and T is the duration of a data symbol period, the (N/2+1) first elements $a_i^{(k)}$ of the first row if N is even, or the (N+1)/2 first elements $a_i^{(k)}$ of the first row if N is odd, said estimation being based on the relation:

$$a_i^{(k)} = \beta a_i^{(k-1)} + x_k^{TR} \cdot x_{k-i}$$

where i is an integer with $0 \leq i \leq N-1$ and $\beta$ is a constant with $0 < \beta < 1$, a second circuit connected to said first circuit for forming a vector $U^{(k)} = [r_0^{(k)}, r_1^{(k)}, r_2^{(k)}, \ldots, r_{N-2}^{(k)}, r_{N-1}^{(k)}]^{TR}$ in which $r_i^{(k)} = a_i^{(k)}$ for every i not exceeding N/2 if N is even, or not exceeding (N-1)/2 if N is odd, and $r_i^{(k)} = a_{N-i}^{(k)}$ for every i exceeding said limits, a third circuit connected to said second circuit for forming a vector $$\Lambda^{(k)} = [\lambda_0^{(k)}, \lambda_1^{(k)}, \lambda_2^{(k)}, \ldots, \lambda_{N-1}^{(k)}]^{TR},$$

whose components are the eigenvalues of a circulant matrix having said vector $U^{(k)TR}$ as a first row, with the aid of the relation:

$$\Lambda^{(k)} = \sqrt{N} \cdot P \cdot U^{(k)}$$

where P is the unitary matrix of the order N defined by:

$$P = \| P_{f,g} \|$$

(f,g = 0, 1, 2, ..., N−2, N−1)

and $$P_{f,g} = \frac{1}{\sqrt{N}} \exp[j\, 2\pi f g/N].$$

a fourth circuit connected to the data transmission channel output and the multiplying circuit output for forming a vector $Q^{(k)}$ with the aid of the relation:

$$Q^{(k)} = \alpha_k e_k \cdot P^{cc} \cdot X_k$$

where $P^{cc}$ is the complex conjugate of said unitary matrix P, a fifth circuit connected to said fourth and third circuits for dividing said vector $Q^{(k)}$ by said vector $\Lambda^{(k)}$ on a term-by-term basis so that the resulting vector $F^{(k)} = [f_0^{(k)}, f_1^{(k)}, f_2^{(k)}, \ldots, f_{N-1}^{(k)}]^{TR} = Q^{(k)}/\Lambda^{(k)}$ has components $f_i^{(k)} = q_i^{(k)}/\lambda_i^{(k)}$ for every i, a sixth circuit connected to said fifth circuit for multiplying said vector $F^{(k)}$ by said unitary matrix for producing a vector $H^{(k)} = P \cdot F^{(k)}$, a seventh circuit connected to said sixth circuit and said transversal filter for up-dating the vector $C_k$ of the N weighting coefficients of said transversal filter at the instant $t_o + kT$ so as to produce a coefficient vector $C_{k+1}$ at the instant $t_o + (k+1)T$ in accordance with the relation:

$$C_{k+1} = C_k - H^{(k)}$$

In a second embodiment of the adaptive system according to the present invention, the system further comprises:

an eighth circuit connected to the data transmission channel output for multiplying said signal vector $X_k$ by said unitary matrix P, the resulting signal vector $Z_k = P \cdot X_k$ being applied to said transversal filter input, a ninth circuit interconnecting said sixth and seventh circuits for multiplying said vector $H^{(k)}$ at the output of said sixth circuit by said matrix $P^{cc}$ and applying the resulting vector $P^{cc} \cdot H^{(k)}$ to said seventh circuit, said seventh circuit being arranged for up-dating the vector $D_k = P^{cc} \cdot C_k$ representing the N weighting coefficients of said transversal filter at the instant $t_o + kT$ when this filter receives said signal vector $Z_k$, so as to produce a coefficient vector $D_{k+1} = P^{cc} \cdot C_{k+1}$ at the instant $t_o + (k+1)T$ in accordance with the relation:

$$D_{k+1} = D_k - P^{cc} \cdot H^{(k)}$$

BRIEF DESCRIPTION OF THE DRAWINGS

Further particulars of the invention will be apparent from the following detailed description with reference to the accompanying drawings in which:

FIG. 2b shows a simplified form of this matrix A taking account of the fact that x(t) is a random process of the stationary type, and FIG. 2c shows a still further simplified form of the matrix A taking account of the length of the sampled response of the channel;

FIG. 3a represents, for the case where N is odd and equal to 2S+1, the circulant matrix R chosen, on the basis of FIG. 2b, so as to constitute the approximation of the matrix A, and FIG. 3b shows a simplified form of said matrix R taking account of the length l of the sampled response of the channel;

FIG. 4 shows which partition may be effected in the structure of the matrix product of the inverse of the matrix R by the matrix A;

DESCRIPTION OF THE PREFERRED EMBODIMENTS

Figures 1, 2A:
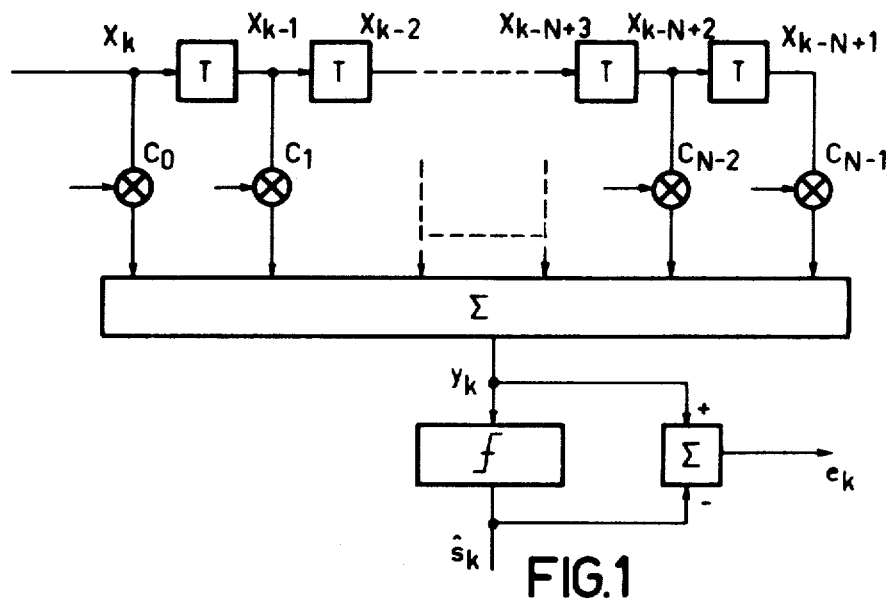
FIG. 1 shows a non-recursive transversal filter of a known type, having N weighting coefficients.
FIG. 2a shows the signal autocorrelation matrix A of N consecutive samples of the random process x(t) to which the consecutive output signal vectors $X_k$ of the data transmission channel correspond.

To describe the two embodiments of the system in accordance with the invention, specified more in detail hereinafter, it is first assumed that the transmitter system provided at the beginning of the transmission channel transmits a stream of non-correlated binary data $s_k$, equal to $\pm 1$, that the impulse response of the transmission channel, is h(t), and that the receiver is in perfect synchronization with the transmitter.

If x(t) is the signal received and sampled at a rate of 1/T (T being the duration of a data symbol) and if the sample entering the equalizer at an instant $t_o + kT$ is defined by the relation:

$$x_k = \left( \sum_{j=0}^{j=l-1} h_j \cdot s_{k-j} \right) + n_k \tag{1}$$

where l is the length of the sampled response of the transmission channel and $n_k$ the noise at the instant $t_o + kT$, it is possible to define for an adaptive equalizer having N weighting coefficients $c_0, c_1, c_2, \ldots c_{N-2}, c_{N-1}$ (see FIG. 1) the following column vectors, which for the sake of convenience are written in the equivalent form of the transpose row vectors (TR indicating the transposition operator):

$$X_k = [x_k, x_{k-1}, \ldots, x_{k-N+2}, x_{k-N+1}]^{TR} \tag{2}$$

$$C = [c_0, c_1, c_2, \ldots, c_{N-2}, c_{N-1}]^{TR} \tag{3}$$

By definition, the output signal of the equalizer, before decision, is:

$$y_k = C^{TR} \cdot X_k \tag{4}$$

or, in an equivalent form:

$$y_k = X_k^{TR} \cdot C \tag{4 bis}$$

and the difference, at the instant defined by k, between $y_k$ and the corresponding digital data $\hat{s}_{k-d}$ is given by the relation:

$$e_k = C^{TR} \cdot X_k - \hat{s}_{k-d}$$

or $$e_k = X_k^{TR} \cdot C - \hat{s}_{k-d} \quad (5)$$

It should be noted that the decision about each transmitted symbol is produced with a delay d·T with respect to the transmission of said symbol, which delay d·T can be optimized for minimizing the mean square error, in the manner indicated more in particular in an article by P. Butler and A. Cantoni, "Non-iterative Automatic Equalization", published in IEEE Transactions on Communications, Vol. COM-23, No. 6, page 622, § III-A, lines 5-6, and page 624, § C, of said article. It is assumed that all decisions are correct, i.e. $\hat{s}_{k-d} = s_{k-d}$ for every value of k.

In the equalizer art there are different criteria to reduce this difference between the exact form of the transmitted signals and the estimated form they have at the output of the equalizer. Here we shall consider one of the most frequently used criteria, namely the criterion of minimizing the mean square error, and we shall therefore try to choose the vector C in order to minimize the mean value of $e_k^2$.

Using the two equivalent relations (4) and (4 bis) simultaneously results in that:

$$e_k^2 = (C^{TR} \cdot X_k - s_{k-d})(X_k^{TR} \cdot C - \hat{s}_{k-d})$$

$$e_k^2 = C^{TR} \cdot X_k \cdot X_k^{TR} \cdot C - 2 C^{TR} \cdot X_k \hat{s}_{k-d} + 1 \quad (6)$$

The mean value of $e_k^2$ is taken, namely:

$$E(e_k^2) = C^{TR} \cdot A \cdot C - 2 C^{TR} \cdot V + 1 \quad (7)$$

where E is the expectation operator and:

$$A = E(X_k \cdot X_k^{TR}) \quad (8)$$

$$V = E(X_k \cdot \hat{s}_{k-d}) \quad (9)$$

The relation (7) defines the mean square error for a given vector C, which error should be minimized as a function of C. For this purpose, it is necessary that:

$$\text{gradient } (C) = G(C) = \frac{\partial E}{\partial C} = 2(AC - V) = 0$$

G(C) is zero if AC = V, that is to say if:

$$C = A^{-1} V \quad (10)$$

The vector C searched for might therefore be obtained by direct resolution of the equation (10). This resolution is considered to be difficult, for it implies the inversion of the matrix A, that is to say the realization of a very large number of operations, but a novel method of direct determination of an approximated vector of C, which avoids such a complex operation is proposed and described in Applicants' copending U.S. patent application Ser. No. 260,617, filed on May 15, 1981 too.

However, in the foregoing it was mentioned for what reasons iterative methods are used more often. According to the invention which is the subject of the present application and which relates to a novel iterative method of determination of the vector of the weighting coefficients of the equalizer, the expression of the following iterative algorithm will first be considered:

$$C_{k+1} = C_k - \alpha_k \cdot A_k^{-1} \cdot X_k e_k \quad (11)$$

which algorithm is of the type employed in the transversal equalizer of the receiving system described in the article by Gitlin and Magee mentioned in the foregoing, and in which:

$C_k$ = vector C at the instant $t_o + kT$
$C_{k+1}$ = vector C at the instant $t_o + (k+1)T$
$\alpha_k$ = iteration step (fixed or variable)
$A_k^{-1}$ = the inverse of the matrix $A_k$ defined by:

$$A_k = \frac{1}{k} \sum_{i=1}^{i=k} X_i X_i^{TR}$$

$A_k$ is the estimated matrix, at the instant $t_o + kT$, of the signal autocorrelation matrix A.

In the expression (11), the estimating $A_K^{-1}$ must be calculated at each iteration in accordance with the following relation:

$$A_k^{-1} = \frac{k}{k-1} \left[ A_{k-1}^{-1} - \frac{A_{k-1}^{-1} X_k X_k^{TR} A_{k-1}^{-1}}{k - 1 + X_k^{TR} A_{k-1}^{-1} X_k} \right] \quad (12)$$

The relation (12) clearly shows the complexity of the solution adopted in the system described in the article by Gitlin and Magee. However, as $A_k^{-1}$ rapidly converges to $A^{-1}$, it is possible to avoid this complexity by searching for an approximation of the matrix $A^{-1}$, and consequently of the matrix A. Such an algorithm is based on the following observations: the matrix A defined by the relation (8) and shown in FIG. 2a is the autocorrelation matrix of N consecutive samples of the random process x(t). As this process is of the stationary type, all the elements $E(X_i^2)$ are equal; for the same reason, all the elements $E(X_i \cdot X_j)$ for which $|i-j|$ is constant are also equal. As a result thereof, matrix A is symmetrical, its diagonal elements are equal and it can therefore be written in the form shown in FIG. 2b. On the other hand as l is the length of the impulse response of the channel, all the elements $E(X_i \cdot X_j)$ in which the difference between i and j is equal to or higher than l are zero, as they correspond to received signals between which there is no correlation whatsoever. Ultimately, the matrix A therefore takes the simplified form shown in FIG. 2c.

This matrix A is quasi-diagonal (and also its inverse matrix $A^{-1}$, but for marginal effects) and it is possible to define an approximation, which is better according as the number N of the equalizer coefficients is chosen greater with respect to the length l. This approximation is a circulant matrix R which is constructed in the following way. If ($a_0, a_1, a_2, \ldots a_{N-2}, a_{N-1}$) is the first row of A and ($r_0, r_1, r_2 \ldots r_{N-1}$) the first row of R, the element $r_i$ is defined by $r_i = a_i$ for every i which is lower than or equal to N/2 if N is even, or to (N−1)/2 if N is odd, and by $r_i = a_{N-i}$ for every i which is higher than these limits.

The following rows of R, of the order 2 to N, comprise the same elements as the first row of R, but after cyclic permutation of these elements to the right: after a cyclic permutation to the right for the second row with respect to the first row, after a further cyclic permutation to the right for the third row with respect to the second row, and so on up to the $N^{th}$ row of R. For the case that N is odd and equal to (2S+1), the matrix R thus obtained is shown in FIG. 3a. Just like the matrix A, said matrix R may assume the simplified form shown in FIG. 3b and corresponding to the simplified form of A shown in FIG. 2c.

As $A_k^{-1}$ rapidly converges to $A^{-1}$, the expression (11) becomes:

$$C_{k+1} = C_k - \alpha_k A^{-1} X_k e_k \tag{12}$$

and, taking the average value, relation (12) becomes:

$$E(C_{k+1}) = E(C_k) - \alpha_k A^{-1} E(X_k e_k) \tag{13}$$

In accordance with the relations (4), (4 bis) and (5):

$$e_k = X_k^{TR} \cdot C_k - \hat{s}_{k-d}$$

hence $$E(X_k e_k) = E(X_k X_k^{TR}) C_k - E(X_k \hat{s}_{k-d})$$

$$E(X_k e_k) = A C_k - V \tag{20}$$

$$E(X_k e_k) = A C_k - A C = A(C_k - C) = A \overline{C}_k \tag{14}$$

where we have used the notation $\overline{C}_k = C_k - C$ and by transferring this result to relation (13), the latter becomes:

$$E(C_{k+1}) = E(C_k) - \alpha_k \overline{C}_k \tag{15}$$

This relation (15) furnishes at each iteration the optimum adjustment direction and, consequently, converges very rapidly. The importance of replacing $A^{-1}$ by a matrix which constitutes a proper approximation, thus by $R^{-1}$ in the present case, in order to avoid a complicated procedure to obtain the estimated matrix of $A^{-1}$, will be evident. The calculation of $R^{-1}$ A undertaken to justify this approximation actually shows that the matrix product has the shape shown in FIG. 4 and that it comprises:

a kernel which is identical to the identity matrix of the order $N-2(l-1)$;

zero elements above and below said identity matrix; and on either side of the columns which include said identity matrix and said zero elements, $2(l-1)$ columns which contain non-zero elements.

Taking account of this structure of the product $R^{-1} \cdot A$ and of the partition effected here in order to show its particular character (and taking account of the fact that the mathematical study of the matrix R shows that this matrix R is always defined and that its inverse matrix always exists), the matrix R as defined in the foregoing is asymptotically equivalent to the matrix A and constitutes a proper approximation (satisfactory even if the number N of the coefficients is not very large).

After having justified in this way the approximation of A by R, the fact that A is the limit of its estimate $A_k$ at the instant $t_o + kT$ results in that R is also the limit of its estimate $R_k$ at the instant $t_o + kT$. The expression (12), may be replaced by:

$$C_{k+1} = C_k - \alpha_k R^{-1} X_k e_k \tag{16}$$

and expression (11) by:

$$C_{k+1} = C_k - \alpha_k R_k^{-1} X_k e_k \tag{17}$$

Diagonalizing the matrix $R_k$ makes it possible to write:

$$R_k^{-1} = P G_k^{-1} P^{cc} \tag{18}$$

where:

$G^{-1}$ = diagonal matrix whose diagonal elements are the inverse values of the eigenvalues $\lambda_0^{(k)}, \lambda_1^{(k)}, \lambda_2^{(k)}, \ldots,$ $\lambda_{N-2}^{(k)}, \lambda_{N-1}^{(k)}$ of the matrix $R_k$;

P = the simmetrical unitary matrix of the order N, which is known a priori as this matrix is independent of $R_k$ and common to all the circulant matrices and whose columns are the eigenvectors of the matrix $R_k$ (this matrix P may be defined by:

$$P = \|P_{f,g}\| \quad (f \cdot g = 0, 1, 2, \ldots, N-2, N-1)$$

$$P_{f,g} = \frac{1}{\sqrt{N}} \exp[j\, 2\pi fg/n]$$

and the multiplication of a vector by this matrix produces, but for the coefficient $1/\sqrt{N}$ the inverse Discrete Fourier Transform, or the inverse DFT, of this vector); and where:

$P^{cc}$ = the complex conjugate matrix of P (in a similar manner, said matrix $P^{cc}$ may be defined by:

$$P^{cc} = \|P_{f,g}^{cc}\| \quad (f,g = 0, 1, 2, \ldots, N-2, N-1)$$

$$P_{f,g}^{cc} = \frac{1}{\sqrt{N}} \exp[-j\, 2\pi fg/N]$$

and multiplying a vector by $P^{cc}$ produces, but for the coefficient $1/\sqrt{N}$, the Discrete Fourier Transform, or DFT, of this vector).

By transferring the expression (18) to the expression (17) it becomes:

$$C_{k+1} = C_k - \alpha_k P G_k^{-1} P^{cc} X_k e_k \tag{19}$$

It will be seen that from now onwards the vector $$\Lambda^{(k)} = [\lambda_0^{(k)}, \lambda_1^{(k)}, \lambda_2^{(k)}, \ldots, \lambda_{N-2}^{(k)}, \lambda_{N-1}^{(k)}]^{TR}$$

of the N eigenvalues of $R_k$ is obtained by means of the following relation:

$$\Lambda^{(k)} = \sqrt{N} \cdot P \cdot U^{(k)} \tag{20}$$

in which P has already been defined and $U^{(k)}$ is the column vector of the N elements of the first column of $R_k$.

Figure 5:
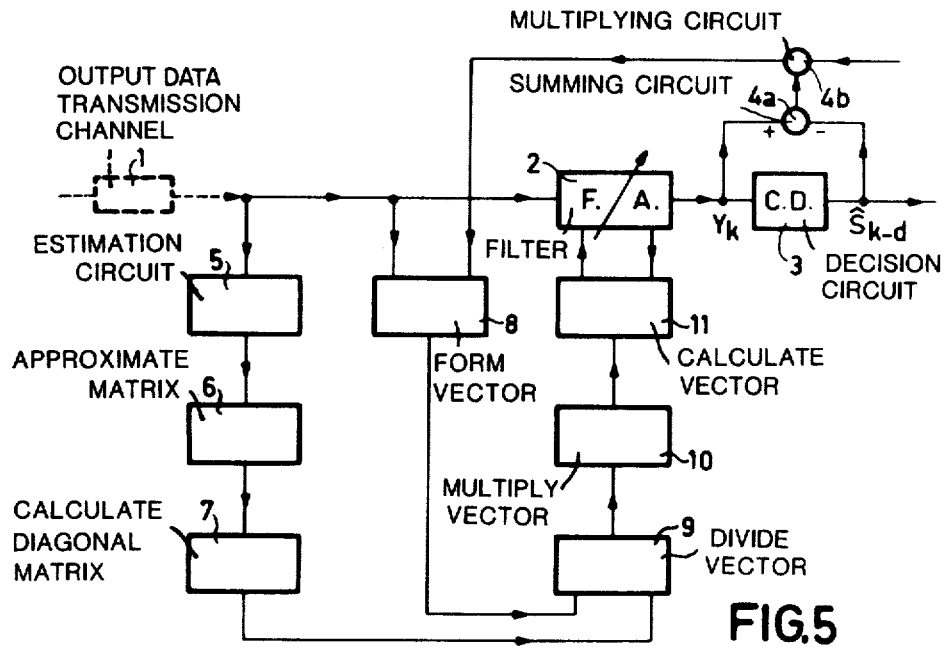
FIG. 5 shows a first embodiment of the adaptive system in accordance with the invention.

From the expression (19) it is possible to derive a first structure of the digital data receiving system, which structure permits of obtaining the vector of the optimum weighting coefficients for the adaptive filter of this system by consecutive iterations. This system is shown in FIG. 5 and comprises at the output of a data transmission channel 1 a non-recursive adaptive filter 2, designated F.A., which has adjustable weighting coefficients, and receives the output signal vector $X_k$ of the transmission channel. This filter is followed by a decision circuit 3, designated C.D., which produces from the output signal $y_k$ of the filter an estimation $\hat{s}_{k-d}$ of each of the digital data $s_{k-d}$ applied to the input of the channel (the system knows the transmitted digital data only during the acquisition or training phase and only then the estimation $\hat{s}_{k-d}$ is always equal to the data $s_{k-d}$ itself). A summing circuit 4a, which receives $y_k$ and $\hat{s}_{k-d}$, produces a difference signal $e_k = y_k - \hat{s}_{k-d}$ which represents the difference between the output of the filter and the estimation of the transmitted data; a multiplying circuit 4b which multiplies $e_k$ by the step $\alpha_k$ produces the scalar quantity $\alpha_k e_k$.

For the determination of the weighting coefficients of the filter 2 the system shown in FIG. 5 also comprises:

(A) an estimation circuit 5 for the square matrix $A_k$, which matrix is an estimate of the autocorrelation matrix of the signal vectors $X_k$ at the instant $t_o + kT$. It should be noted that the estimation of $A_k$ does not signify the estimation of $N^2$ elements, but simply, in its first row, the estimation of the $(N/2+1)$ first elements $a_i^{(k)}$ if N is even, or of the $(N+1)/2$ first elements $a_i^{(k)}$ if N is odd, on the basis of the relation $$a_i^{(k)} = \beta a_i^{(k-1)} + x_k \cdot x_{k-i}$$

where $\beta$ is a constant located between the values 0 and 1 but not including these values. This important reduction of the number of the elements to be estimated is very advantageous as regards the simplicity of the circuits.

(B) a circuit 6 for approximating the matrix $A_k$ by a circulant matrix $R_k$, this approximation of $A_k$ by $R_k$ being obtained in a simple way by substituting the first row $$[a_0^{(k)}, a_1^{(k)}, a_2^{(k)}, \ldots, a_{N-2}^{(k)}, a_{N-1}^{(k)}] \text{ of } A_k \text{ by a first row}$$

$$[r_0^{(k)}, r_1^{(k)}, r_2^{(k)}, \ldots, r_{N-2}^{(k)}, r_{N-1}^{(k)}]$$

in which $r_i = a_i$ for every i not exceeding $N/2$ if N is even, or not exceeding $(N-1)/2$ if N is odd, and $r_i = a_{N-i}$ for every i higher than these limits. As $R_k$ is circulant, the determination of its first row is sufficient to know the entire matrix, and the approximation of $A_k$ by $R_k$ amounts therefore to not more than the formation of the vector $$U^{(k)} = [r_0^{(k)}, r_1^{(k)}, r_2^{(k)}, \ldots, r_{N-2}^{(k)}, r_{N-1}^{(k)}]^{TR} \text{ in which } r_i^{(k)} = a_i^{(k)}$$

for every i not exceeding $N/2$ if N is even, or not exceeding $(N-1)/2$ if N is odd, and $$r_i^{(k)} = a_{N-i}^{(k)}$$

for every i higher than these limits.

(C) a circuit for calculating the diagonal matrix $G_k$, whose diagonal terms are the eigenvalues of the circulant matrix $R_k$, which circuit, taking account of the simplifications already effected sub (A) and (B), actually consists of a circuit 7 for forming a vector $\Lambda^{(k)}$ of N eigenvalues $\lambda_0^{(k)}, \lambda_1^{(k)}, \lambda_2^{(k)}, \ldots$ $$\lambda_{N-2}^{(k)}, \lambda_{N-1}^{(k)}$$

by means of the relation $\Lambda^{(k)} = \sqrt{N} \cdot P \cdot U^{(k)}$, in which P is the unitary matrix which has already been defined.

(D) a circuit 8 for forming the vector $Q^{(k)} = \alpha_k e_k P^{cc} X_k$ which circuit 8 ensures in fact the multiplication of the signal vector $X_k$ by the complex conjugate matrix $P^{cc}$ of P and the multiplication of the vector thus obtained by the scalar quantity $\alpha_k e_k$.

(E) a circuit for multiplying the output of circuit 8 by the diagonal matrix $G_k^{-1}$, which circuit actually consists, because of the simplifications already effected, of a circuit 9 for dividing the vector $Q^{(k)}$ by the vector $\Lambda^{(k)}$ on a term-by-term basis so that the resulting vector $$F^{(k)} = [f_0^{(k)}, f_1^{(k)}, f_2^{(k)}, \ldots, f_{N-2}^{(k)}, f_{N-1}^{(k)}]^{TR} = Q^{(k)}/\Lambda^{(k)}$$

has components of $f_i^{(k)} = q_i^{(k)}/\lambda_i^{(k)}$, whatever the value of i.

(F) a circuit 10 for multiplying the vector $F^{(k)}$ thus obtained by the matrix P.

(G) a circuit 11 for calculating the vector $C_{k+1} = C_k - P \cdot F^{(k)} = C_k - H^{(k)}$ which, at the instant $t_o + (k+1)T$, represents the vector of the N weighting coefficients of the transversal filter 2 and which is obtained by the difference between the vector $C_k$, evaluated in a similar way in the course of the preceding iteration step corresponding to the instant $t_o + kT$, and the vector $H^{(k)}$ at the output of the circuit 10; this circuit 11 is arranged in a conventional way for up-dating the coefficients of filter 2 by substituting $C_{k+1}$ for $C_k$.

A second structure of the receiving system in accordance with the invention can be derived from the expression (19) obtained above, if a multiplication of the two members of this expression by $P^{cc}$ is effected. Then there is obtained:

$$P^{cc}C_{k+1} = P^{cc}C_k - \alpha_k P^{cc}PG_k^{-1}P^{cc}X_k e_k \quad (21)$$

$$D_{k+1} = D_k - \alpha_k G_k^{-1}P^{cc}X_k e_k \quad (21 \text{ bis})$$

Figure 6A:
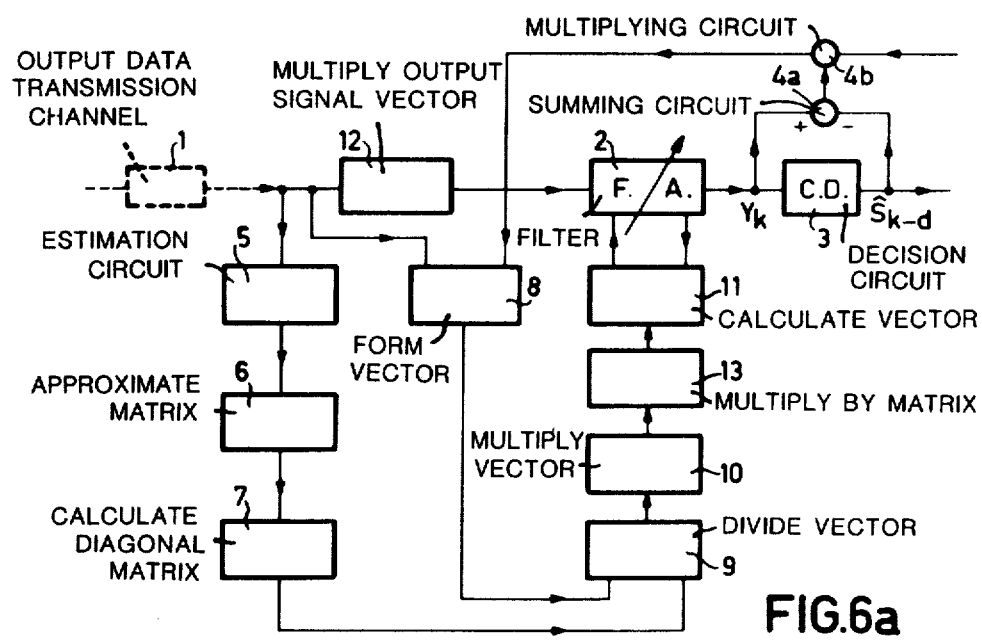
FIG. 6a and FIG. 6b show two variants of the structure of a second embodiment of the adaptive system in accordance with the invention.

In FIG. 6a this multiplication of the expression (19) by $P^{cc}$ results, with respect to FIG. 5, in the appearance of the two supplementary circuits 12 and 13. The circuit 12 ensures the multiplication of the output signal vector $X_k$ of the transmission channel 1 by the unitary matrix P in order to supply a signal vector $Z_k$ which is applied to the transversal filter 2, and the circuit 13, which is inserted between the circuits 10 and 11 ensures the multiplication of the output of the circuit 10 by the matrix $P^{cc}$. As the output signal of the filter, in the case of the above-described first structure, was given by $$y_{k+1} = X_{k+1}^{TR} C_{k+1}$$

(in accordance with the relation 4 bis) and this expression may also be written as follows:

$$y_{k+1} = X_{k+1}^{TR} (P P^{cc}) C_{k+1}$$

it is obtained that:

$$y_{k+1} = (X_{k+1}^{TR} P) \cdot (P^{cc} C_{k+1}) \quad (22)$$

$$y_{k+1} = Z_{k+1}^{TR} \cdot D_{k+1}$$

In order that the output signal of the filter 2 in the course of the corresponding iteration at the instant $t_o+(k+1)T$ will be the same as in the case of the first structure, the circuit 11 must therefore now produce the vector $D_{k+1}=P^{cc}\cdot C_{k-1}$ obtained from the difference between the vector $D_k$, evaluated in the course of the preceding iterative stage corresponding to the instant $t_o+kT$, and the vector of the output $P^{cc}\cdot H^{(k)}$ of the circuit 13.

Figure 6B:
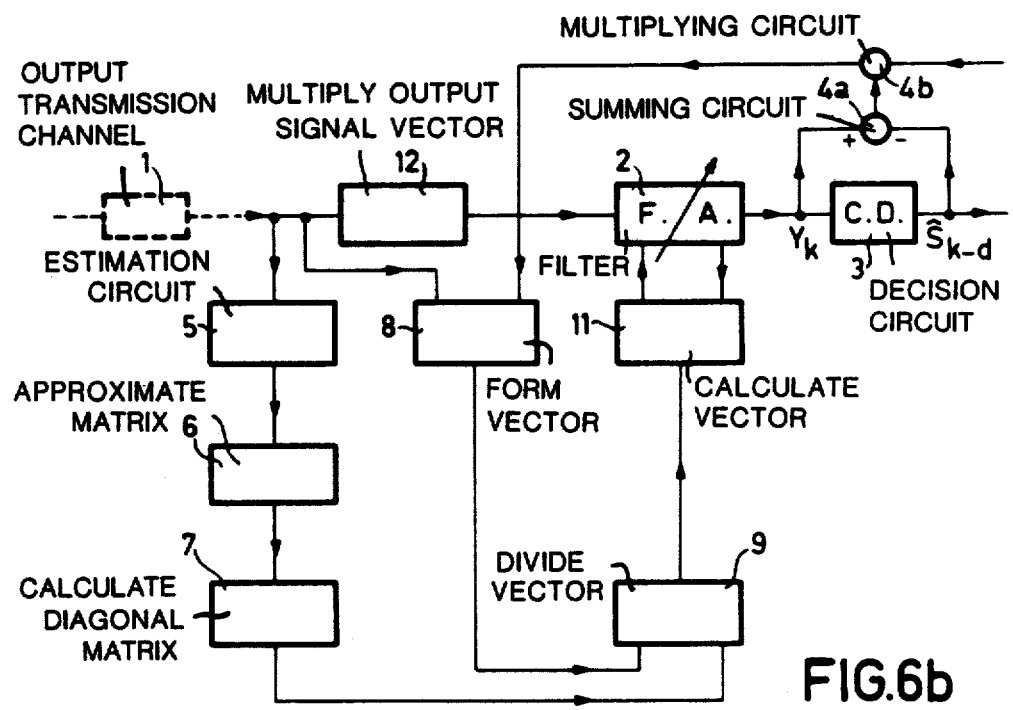

From FIG. 6a corresponding to the second structure thus described it can be seen that, with the introduction of the circuit 13, the circuits 10 and 13 effect consecutively operations which are the inverse of each other (multiplication by the matrix P, thereafter multiplication by the matrix $P^{cc}$). These two circuits may therefore both be omitted, which results in the variant of the simplified embodiment of FIG. 6b.

It will be understood that further embodiments of the invention may still be proposed without departing from the scope of the invention.

What is claimed is:

1. In a digital data receiver, an adaptive system providing compensation for amplitude and phase distortions introduced by a data transmission channel and comprising an adaptive equalizing circuit receiving a signal vector $X_k$ from the data transmission channel output and producing an output signal $y_k$, a decision circuit receiving this output signal $y_k$ and producing an estimation $\hat{s}_{k-d}$ of each one of the digital data $s_{k-d}$ applied to the data transmission channel input, a summing circuit receiving said output signal $y_k$ and said estimation $\hat{s}_{k-d}$ for producing a difference signal $e_k = y_k - \hat{s}_{k-d}$, and a multiplying circuit for multiplying said difference signal $e_k$ by an iteration step $\alpha_k$, characterized in that the adaptive equalizing circuit is a non-recursive transversal filter having N adjustable weighting coefficients and the adaptive systems comprises for the determination of these coefficients by consecutive iterations:

a first circuit for determining, in a matrix $A_k$ which is an estimation of the square signal autocorrelation matrix $A=E(X_k \cdot X_{kTR}{}^{TR})$ at an instant $t_o+kT$, where E is the expectation operator, $X_k$ is the transpose of $X_K$, $t_o$ is a constant, k is an integer and T is the duration of a data symbol period, the $(N/2+1)$ first elements $a_{i(k)}$ of the first row if N is even, or the $(N+1)/2$ first elements $a_i$ of the first row if N is odd, said estimation being based on the relation:

$$a_i^{(k)} = \beta a_i^{(k-1)} + x_k \cdot x_{k-i}$$

where i is an integer with $0 \leq i \leq N-1$ and $\beta$ is a constant with $0 < \beta < 1$, a second circuit connected to said first circuit for forming a vector $$U^{(k)} = [r_0^{(k)}, r_1^{(k)}, r_2^{(k)}, \ldots, r_{N-2}^{(k)}, r_{N-1}^{(k)}]^{TR} \text{ in which } r_i^{(k)} = a_i^{(k)}$$

in which $r_i^{(k)} = a_i^{(k)}$ for every i not exceeding N/2 if N is even, or not exceeding $(N-1)/2$ if N is odd, and $$r_i^{(k)} = a_{N-i}^{(k)}$$

for every i exceeding said limits, a third circuit connected to said second circuit for forming a vector $$\Lambda^{(k)} = [\lambda_0^{(k)}, \lambda_1^{(k)}, \lambda_2^{(k)}, \ldots, \lambda_{N-1}^{(k)}]^{TR},$$

whose components are the eigenvalues of a circulant matrix having the transpose of the said vector $U^{(k)}$ as a first row, with the aid of the relation:

$$\Lambda^{(k)} = \sqrt{N} \cdot P \cdot U^{(k)}$$

where P is the unitary matrix of the order N defined by:

$$P = |P_{f,g}|$$
$$(f,g = 0, 1, 2, \ldots, N-2, N-1)$$

and $$P_{f,g} = \frac{1}{\sqrt{N}} \exp[j\, 2\pi fg/N],$$

a fourth circuit connected to the data transmission channel output and the multiplying circuit output for forming a vector $Q^{(k)}$ with the aid of the relation:

$$Q^{(k)} = \alpha_k e_k \cdot P^{cc} \cdot X_k$$

where $P^{cc}$ is the complex conjugate of said unitary matrix P, a fifth circuit connected to said fourth and third circuits for dividing said vector $Q^{(k)}$ by said vector $\Lambda^{(k)}$ on a term-by-term basis so that the resulting vector $$F^{(k)} = [f_0^{(k)}, f_1^{(k)}, f_2^{(k)}, \ldots, f_{N-1}^{(k)}]^{TR} = Q^{(k)}/\Lambda^{(k)}$$

has components $f_i^{(k)} = q_i^{(k)}/\lambda_i^{(k)}$ for every i not exceeding $N-1$, a sixth circuit connected to said fifth circuit for multiplying said vector $F^{(k)}$ by said unitary matrix for producing a vector $H^{(k)} = P \cdot F^{(k)}$, a seventh circuit connected to said sixth circuit and said transversal filter for up-dating the vector $C_k$ of the N weighting coefficients of said transversal filter at the instant $t_o+kT$ so as to produce a coefficient vector $C_{k+1}$ at the instant $t_o+(k+1)T$ in accordance with the relation:

$$C_{k+1} = C_k - H^{(k)}$$

2. An adaptive system as claimed in claim 1, characterized in that the system further comprises:

an eighth circuit connected to the data transmission channel output for multiplying said signal vector $X_k$ by said unitary matrix P, the resulting signal vector $Z_k = P \cdot X_k$ being applied to said transversal filter input, a ninth circuit interconnecting said sixth and seventh circuits for multiplying said vector $H^{(k)}$ at the output of said sixth circuit by said matrix $P^{cc}$ and applying the resulting vector $P^{cc} \cdot H^{(k)}$ to said seventh circuit, said seventh circuit being arranged for up-dating the vector $D_k = P^{cc} \cdot C_k$ representing the N weighting coefficients of said transversal filter at the instant $t_o+kT$ when this filter receives said signal vector $Z_k$, so as to produce a coefficient vector $D_{k+1} = P^{cc} \cdot C_{k+1}$ at the instant $t_o+(k+1)T$ in accordance with the relation:

$$D_{k+1} = D_k - P^{cc} \cdot H^{(k)}$$

* * * * *